A. J. PARIS, Jr.
PROCESS OF SEPARATING HYDROCARBON VAPORS FROM GASES CONTAINING THEM.
APPLICATION FILED MAY 25, 1916.
1,405,154.                                                Patented Jan. 31, 1922.
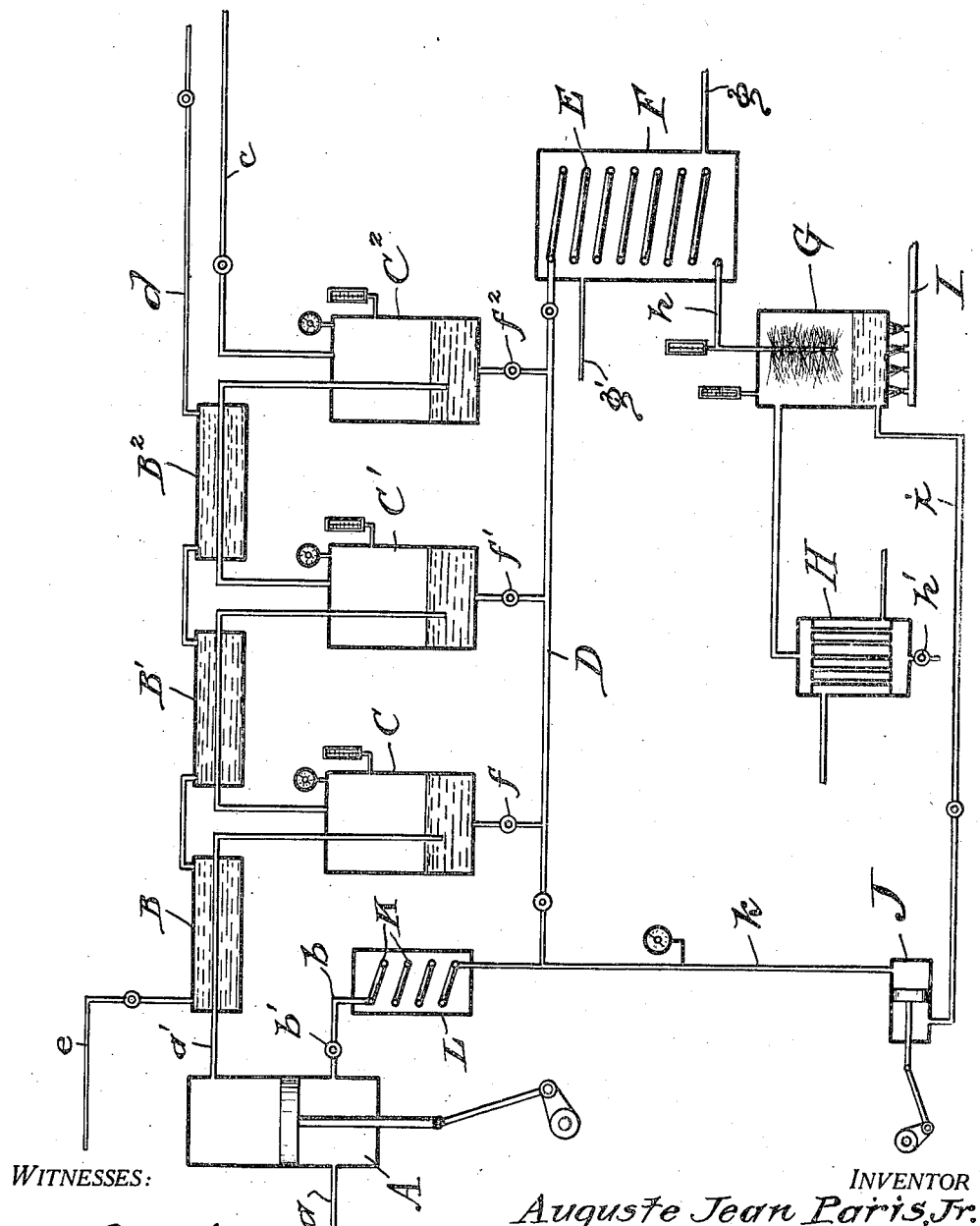
WITNESSES:
INVENTOR
Auguste Jean Paris, Jr.
BY
Jas. H. Griffin
Attorneys

UNITED STATES PATENT OFFICE.

AUGUSTE JEAN PARIS, JR., OF BRADFORD, PENNSYLVANIA.

PROCESS OF SEPARATING HYDROCARBON VAPORS FROM GASES CONTAINING THEM.

1,405,154.     Specification of Letters Patent.     Patented Jan. 31, 1922.

Application filed May 25, 1916. Serial No. 99,801.

*To all whom it may concern:*

Be it known that I, AUGUSTE JEAN PARIS, Jr., a citizen of the United States, residing in Bradford, county of McKean, and State of Pennsylvania, have invented a certain new and useful Process of Separating Hydrocarbon Vapors from Gases Containing Them, of which the following is a specification.

The object of the process is to compress natural, oil, and coal, gas, or analogous gas, in the presence of a liquid, in such quantities and at such temperature that the liquid will absorb, and retain until separated from the gas, certain valuable vapors which it is desired to separate from the gas treated. The vapors thus absorbed are subsequently separated and recovered from the absorbent either in a continuous operation, by means of suitable apparatus connected with the compressor employed, or by separate treatment in a still and condenser similar to that used in refineries.

It is common practice at the present time to absorb gasoline and similar vapors, usually contained in natural gas, by allowing the gas to bubble through certain liquids, for example, lubricating oils, and to subsequently treat such oils so as to separate therefrom, in a liquefied form, the hydrocarbon vapors which they have absorbed. It will be manifest, however, that, as the gas simply passes through the absorbent, the quantity of vapors absorbed thereby is comparatively small, and accordingly, such processes possess only low efficiency.

So far as I am aware, no process has heretofore been utilized, or suggested, for absorbing the hydrocarbon vapors, contained in gases of the character under consideration, by compressing said gases in a compressor, in the presence of a suitable absorbent for the hydrocarbon vapors, and subsequently separating the vapors thus absorbed, in a liquefied form.

In practicing the process, many absorbents may be used, especially when the vapors to be recovered are of different chemical characteristics. For example, in separating paraffins, such as benzene, naphtha, gasoline, petroleum ether, etc., from natural gas, I may use as the absorbent either a paraffin oil or a cracked product. The latter appears to have the capacity of absorbing light paraffins equally as well as, and possibly better than, paraffin oil.

A salient feature of the process, from a practical standpoint, consists in the injection of the absorbent, into the cylinder in which the compression is effected, in quantities sufficiently large, and at a temperature sufficiently low, that the elevation in temperature during the compression shall not be to such degree that the light liquids, i. e., vapors, absorbed will not distill themselves out of the absorbent. That is to say, the absorbent should retain the absorbed vapors until after such absorbent, containing its absorbed vapors, shall have been separated from the main body of the gas under treatment. If the absorbent does not, at each compression operation, absorb its maximum quantity of hydrocarbon vapors, i. e., become substantially saturated therewith, this result being not infrequent, owing to the small percentage of condensable hydrocarbons contained in the gas operated upon, such absorbent, without separation of the vapors which it carries, may be re-used, i. e., re-injected into the compression cylinder, as often as is found desirable, or until it contains, substantially, its maximum degree of saturation, under the particular conditions of operation as to temperature, pressure, quantity of absorbent employed, etc.

The absorbent having been charged with the hydrocarbon vapors, to such extent as is found desirable, the hydrocarbons condensed therein may be separated therefrom in any suitable or desirable manner.

The accompanying drawing illustrates one form of apparatus wherein the method may be practiced, but it will be understood that said method may be carried out in apparatus of distinctly different type from that herein shown.

Referring to the drawing, the single figure shows, diagrammatically, an apparatus which, in practice, has proved suitable for carrying out the method forming the subject matter of this application.

Referring to the drawing, A is a compressor, having a gas inlet $a$, an exhaust $a'$, and an inlet $b$, provided with valve $b'$, for the absorbent. B, B', B² are a plurality of coolers, and C, C', C² a plurality of separators connected therewith, respectively. The absorbent and gas, after compression, pass through cooler B into separator C, and the gas, with any entrained absorbent or vapors, continues its passage, from separator C, through cooler B', separator C', cooler B² and separator $C^2$. Separators C, C' and $C^2$ contain a vapor absorbent, and, as the gas escapes from the last separator $C^2$, through pipe c, it is practically dry and may be utilized for any suitable purpose.

The current of gas and vapors through coolers B, B' and $B^2$ is met by a countercurrent of cooling fluid, water or gas, entering pipe d, and passing successively through coolers $B^2$, B' and B, whereupon it is discharged through pipe e.

Separators C, C', $C^2$ are connected, through valve-controlled draw-off pipes f, f', $f^2$, with a main D, leading to a coil E of heater F. The latter is provided with an inlet g for steam, or superheated steam, and an outlet g' for such used heating agent. The outlet h of heating coil E leads to a still G, in which the condensed or absorbed vapors are separated from the absorbent, said still being connected with a condenser H, having an outlet h' for the recovered and liquefied hydrocarbon or other vapors. Still G may be heated in any desired manner, as by a gas heater I. It will be understood that the distilling operation can be effected in any well known way, either under pressure, vacuum, or normal pressure.

Still G has a draw-off pipe i for the residuary absorbent, which pipe connects with the inlet of a pump J, the outlet k of said pump connecting with a cooling coil K of cooler l, the outlet of said cooling coil leading to compression cylinder A, and serving as the means for introducing the absorbent, under pressure, into said cylinder. Pipe D, which receives the absorbent from separators C, C', $C^2$, is also connected to said pipe k, whereby, if desired, said absorbent may be again injected into the compression cylinder prior to the separation of the condensed vapors therefrom. It will be understood that the apparatus is provided, wherever desired, with thermometers, pressure gages, or other indicating devices.

Having described the apparatus, from a structural standpoint, its mode of operation will now be detailed in connection with the treatment of natural gas by the method forming the subject matter of this invention.

The natural or other gas, having been compressed, in conjunction with the absorbent, in compressor A, enters cooler B, and thence may pass through a quantity of absorbent in separator C, it being understood that the three separators C, C' and $C^2$ contain a certain quantity of the absorbent, for example, lubricating oil, at the beginning of the process. Practically all of the vapors which have been absorbed by the lubricant injected into compressor A are trapped out in separator C. The separated gas passes from separator C, through cooler B', and thence to separator C', where any further absorbent or condensed products carried thereby may be separated. The gas from separator C' passes through a third cooler $B^2$, and thence to separator $C^2$, which completely extracts any absorbent or vapors carried by the gas. From separator $C^2$, the dry gas escapes through pipe c. The absorbent in separators C, C' and $C^2$ may be returned, if desired, through cooling coil K, into compressor A, for re-use.

When the absorbent has become sufficiently saturated with the hydrocarbon or other vapors which it takes up from the gas under treatment, it may be drawn off through pipes f, f' and $f^2$, into main D, and into heating coil E in heater F. The absorbent having been heated to the desired degree in coil E, say 300 degrees Fahrenheit, it passes through pipe h, into still G, wherein the absorbed light hydrocarbons are separated from the absorbent, pass into condenser H, where they are liquefied, and from which they can be withdrawn through pipe h'. The absorbent remaining in still G, may be fed through pipe i, pump J, pipe k, cooling coil K, and pipe b, to compressor A, for re-use, as heretofore described.

It will be understood, of course, that, instead of the operation being continuous, as set forth, the absorbent, containing the condensed light hydrocarbons, may be drawn out of the system, and distilled in stills entirely independent of the system, instead of in the still G, which forms an element of the system described, and which is employed when it is desired to make the operation continuous. One of the main reasons for distilling off the light liquids from the absorbent at frequent periods, or continuously, as described, is because the quantity of absorbent required in the compression cylinder is less in proportion to its freedom from such light liquids, as the heat of compression increases the volatility of the light liquids, their boiling points being, of course, less than that of the absorbent employed. Accordingly, when they are present in comparatively large quantities, it is necessary to employ a larger quantity of the absorbent, but at a lower temperature, than if such absorbent only contained relatively small quantities of the light products. I have found all petroleum and coal oils having boiling points of 300 degrees Fahrenheit, and above, to be entirely satisfactory as absorbents, in the event the absorbents are to be used for extracting light hydrocarbons from the gas under treatment.

The quantity of absorbent used is controlled by the percentage of condensable hydrocarbons contained in the gas under treatment, the gravity of the absorbent, the viscosity of the absorbent, and the temperature of the absorbent at the time of injecting it into the compression cylinder. It is important to bear in mind that the compression should take place at a temperature lower than the boiling or vaporizing point of the liquid to be absorbed. Accordingly, the temperature of the compression cylinder is kept down to a comparatively low point, all of which will be readily understood by those skilled in the art.

In the event it is desired to recover cracked paraffins from coal gas, mineral oils, or sulphuric acid may be employed as the absorbent, it being understood, of course, that in carrying out this process an acid-proof apparatus is employed. If it is desider to recover ammonia from a gas containing it, water, or other solvent or agent which combines with the ammonia, may be used as the absorbent.

It will be understood that minor changes may be made in the specific processes outlined without departing from the spirit of the invention, the scope of which is commensurate with the appended claims.

The apparatus herein described also forms a part of my invention, and I reserve the right to file a divisional application thereon. It will be understood that a plurality of condensers, and likewise a plurality of separators may be used, if desired, the present drawing showing one of each in the interest of simplicity.

Having thus fully described the invention, what I claim as new, and desire to secure by Letters Patent is:

1. The process of recovering light hydrocarbon liquids from natural gas which consists in compressing said gas in a compression cylinder while injecting into said cylinder a refrigerated heavy hydrocarbon oil to absorb said light hydrocarbon liquids, separating the resultant mixture of hydrocarbon oils from the gas, and subsequently separating the light absorbed hydrocarbons from the heavy absorbent oil.

2. The process of recovering light hydrocarbon liquids from natural gas which consists in compressing said gas in a compression cylinder while injecting into said cylinder a heavy hydrocarbon oil to absorb said light hydrocarbon liquids, separating the resultant mixture of hydrocarbon oils from the gas, and subsequently separating the light absorbed hydrocarbons from the heavy absorbent oil.

3. The process of recovering light hydrocarbon liquids from a hydrocarbon gas containing them which consists in compressing said gas in a compression cylinder while injecting into said cylinder a refrigerated heavy hydrocarbon oil to absorb said light hydrocarbon liquids, separating the resultant mixture of hydrocarbon oils from the gas, and subsequently separating the light absorbed hydrocarbons from the heavy absorbent oil.

4. The process of recovering light hydrocarbon liquids from a hydrocarbon gas containing them which consists in compressing said gas in a compression cylinder while injecting into said cylinder a heavy hydrocarbon oil to absorb said light hydrocarbon liquids, separating the resultant mixture of hydrocarbon oils from the gas, and subsequently separating the light absorbed hydrocarbons from the heavy absorbent oil.

In testimony whereof I have signed my name to this specification.

AUGUSTE JEAN PARIS, Jr.